United States Patent [19]
Leonard

[11] Patent Number: 5,137,121
[45] Date of Patent: Aug. 11, 1992

[54] TRAILER WHEEL CHOCK

[76] Inventor: Paul A. Leonard, 13301 Maple Knoll Way, Maple Grove, Minn. 55369

[21] Appl. No.: 687,681

[22] Filed: Apr. 19, 1991

[51] Int. Cl.$^5$ .............................................. B60T 3/00
[52] U.S. Cl. ........................................ 188/32; 70/18; 70/226
[58] Field of Search ............... 188/32; 70/14, 18, 19, 70/226, 229, 259

[56] References Cited

U.S. PATENT DOCUMENTS

| | | |
|---|---|---|
| 1,456,021 | 5/1923 | Hedglin . |
| 2,960,857 | 11/1960 | Winter . |
| 3,065,827 | 11/1962 | Timbers ............................... 188/32 |
| 3,695,071 | 10/1972 | West . |
| 3,828,590 | 8/1974 | Thiebault . |
| 3,907,072 | 9/1975 | Shafer . |
| 4,031,726 | 6/1977 | De Jager . |
| 4,164,131 | 8/1979 | Desmond et al. . |
| 4,175,410 | 11/1979 | Schwaiger . |
| 4,441,586 | 4/1984 | Bernier . |
| 4,649,724 | 3/1987 | Raine ................................... 88/32 |
| 4,768,359 | 9/1988 | Wade . |
| 4,819,462 | 4/1989 | Apsell . |
| 4,833,442 | 5/1989 | Von Heck . |

FOREIGN PATENT DOCUMENTS 675784 2/1930 France ................................. 188/32
2184276 6/1987 United Kingdom .................. 188/32

Primary Examiner—George E. A. Halvosa
Attorney, Agent, or Firm—Haugen and Nikolai

[57] ABSTRACT

A wheel chock device arrangement to be releasably secured to a vehicle wheel, such as a trailer wheel, for temporarily encumbering the normal rotation of the vehicle wheel. The wheel chock device includes a generally triangularly shaped enclosure having a plurality of surfaces defining a substantially wedge-shaped solid with a horizontal leg, a vertical leg, and an inclined leg between the vertical and horizontal legs. A pair of closed opposed end walls enclose the legs to create the wedge-shaped solid. A generally "U"-shaped wheel-engaging jaw with telescopically engagable first and second base segments is provided, with each base segment having a leg element extending generally at right angles from the base segments, and with opposed inwardly extending stub segments extending coaxially inwardly of the leg elements of the first and second base segments. A padlock having a shackle portion arranged to be engaged by the padlock is provided, with the shackle being arranged to extend through mating bores formed in the first and second base segments of the wheel-engaging "U"-shaped jaw.

3 Claims, 4 Drawing Sheets

TRAILER WHEEL CHOCK

BACKGROUND OF THE INVENTION

The present invention relates generally to a wheel chock device arranged to be releasably secured to a vehicle wheel, such as a trailer wheel, whenever the vehicle is left unattended for extended periods of time. The device is accordingly arranged to temporarily encumber the normal rotation of the vehicle wheel so as to discourage unauthorized operation of the vehicle.

Locking wheel chock devices have been utilized in the past to encumber movement of vehicles including self-propelled vehicles as well as trailer vehicles. Recently, a need has developed for a light-weight but yet reliable wheel chock device for releasable mounting upon a vehicle wheel. A typical application of such a device is on a boat trailer, snowmobile trailer, or other like device which may be left unattended for various intervals of time. Uses for such devices are indicated both during the on-season and the off-season. For example, a boat owner may store his boat in the out-of-doors at his residence, but wishes to have a wheel chock device coupled to at least one of the wheels in order to encumber normal rotation thereof. Also, during the on-season, the owner of a boat trailer or snowmobile trailer may wish to utilize such a wheel chock device at times when the vehicle is left unattended, such as at an access point to a lake or other area where the towed mechanized article may be used.

In order to provide such a device which is both light-weight and reliable, an enclosure means is provided which includes a generally triangular wedge-shaped solid block with closed opposed end walls enclosing a closed ramping surface. The ramping surface is designed to be positioned in contact with the arcuate surface of the vehicle tire being encumbered. The leg surfaces of the wedge-shaped solid block comprise opposed flange elements which extend inwardly from each of the opposed triangular end walls. A pair of aligned bores are formed within the triangular shaped end walls so as to accommodate a generally "U"-shaped wheel-engaging jaw element therewithin. The jaw element is provided with a number of mating bores for accommodating the shackle of a padlock therewithin so as to secure the jaw in closed disposition about the vehicle wheel. The triangular end walls further include inwardly extending opposed flange elements so as to define a gap zone therebetween. The gap zone is adapted to permit the user to place the padlock in position on the telescopically engaged jaw segments so as to complete the wheel encumbering operation. In this arrangement, the gap zone formed between the opposed flange elements is designed to prevent ease of ingress of a force-applying lever such as a crowbar or the like. Essentially, firm or fixed leverage cannot be readily achieved due to the presence of the vehicle tire adjacent the wedge-shaped solid enclosure.

SUMMARY OF THE INVENTION

Therefore it is a primary object of the present invention to provide an improved wheel chock locking device which is light in weight, but yet rugged and durable, and designed to protect a locking device from tampering with external force-applying levers such as crowbars and the like.

It is yet a further object of the present invention to provide an improved wheel chock device which is arranged to be conveniently releasably secured to a vehicle wheel for temporarily encumbering the normal rotation of the wheel.

It is still a further object of the present invention to provide an improved wheel chock device which is arranged to be releasably secured to a vehicle wheel, and which is designed to reduce the opportunity for tampering.

Other and further objects of the present invention will become apparent to those skilled in the art upon a study of the following specification, appended claims, and accompanying drawings.

IN THE DRAWINGS

DESCRIPTION OF THE PREFERRED EMBODIMENT

Figure 1:
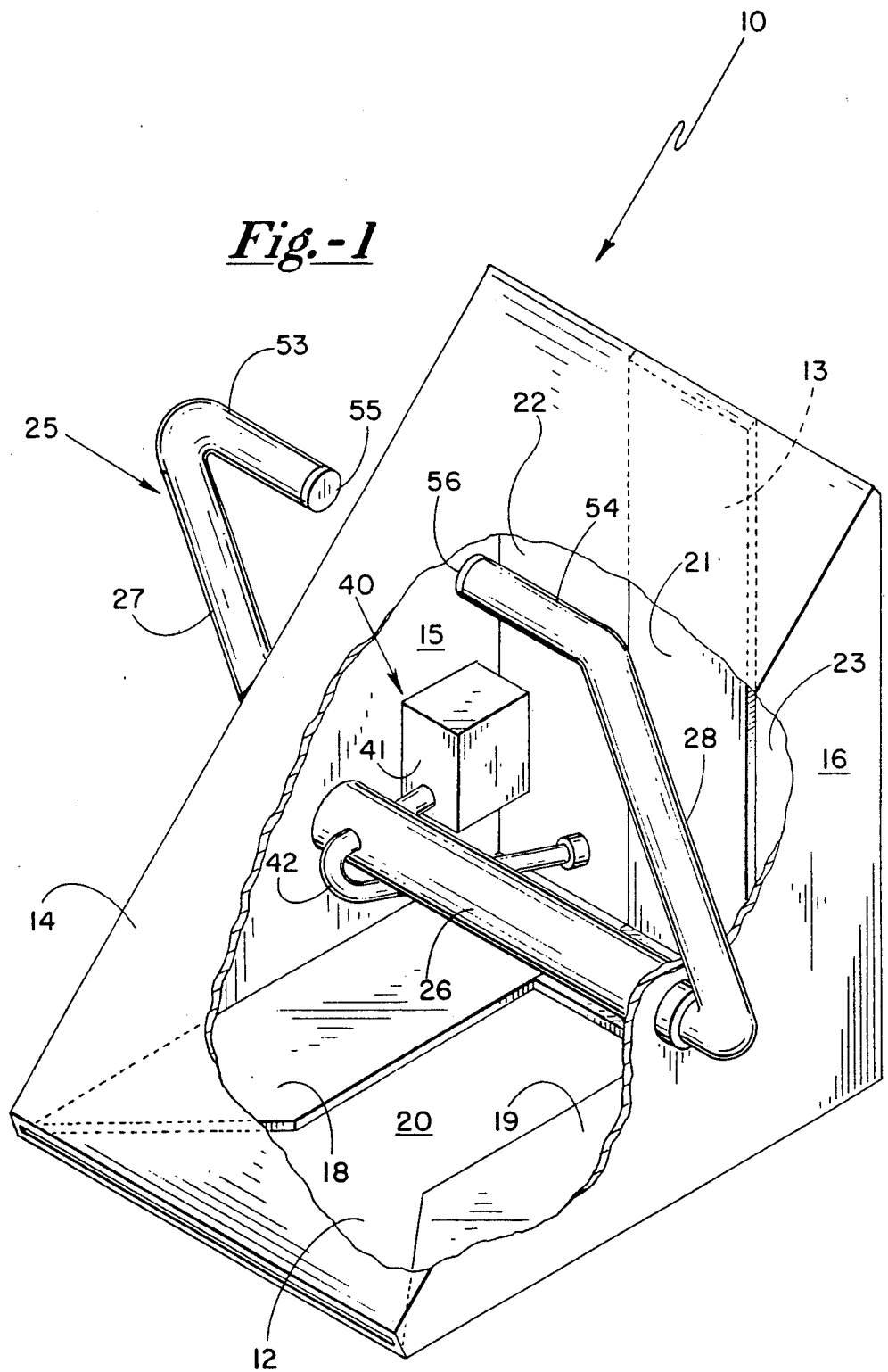
FIG. 1 is a perspective view of the wheel chock device of the present invention, with a portion of the solid enclosure being broken away so as to expose internal components to view.
Figure 2:
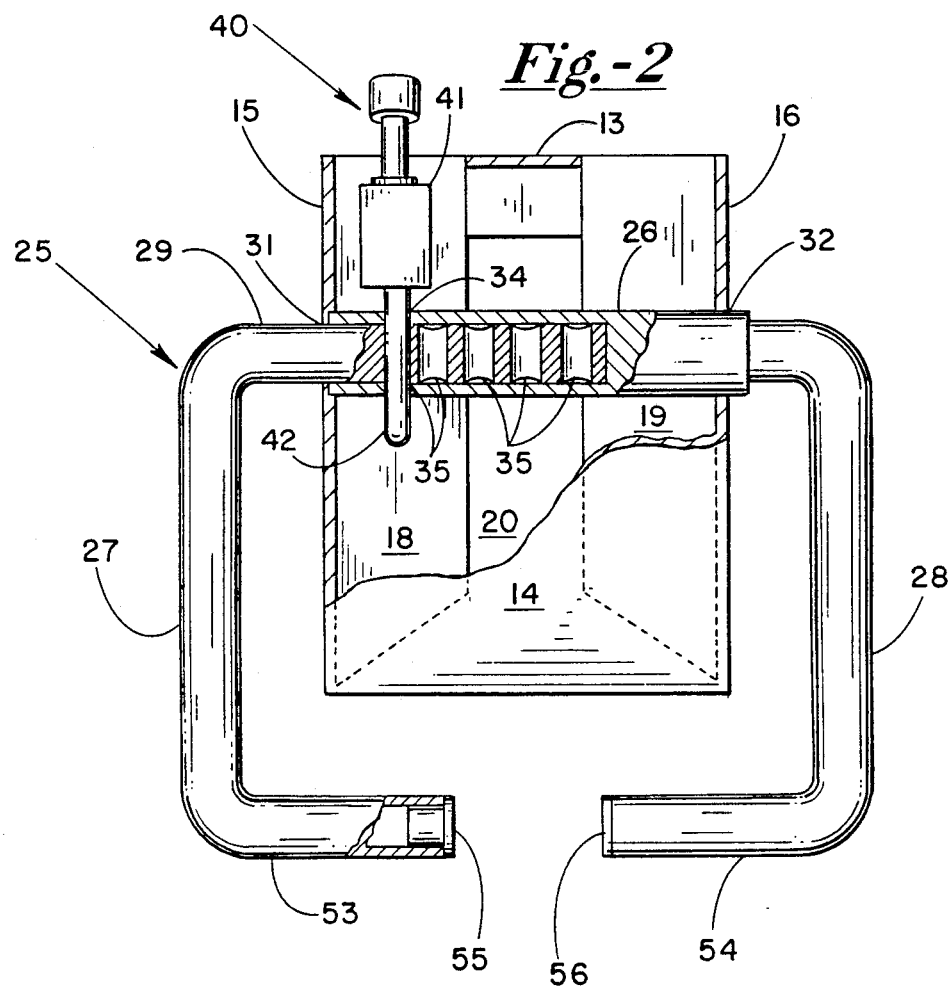
FIG. 2 is a top plan view taken along a plane normal to the surface of the inclined leg of the wheel chock device illustrated in FIG. 1.
Figure 3:
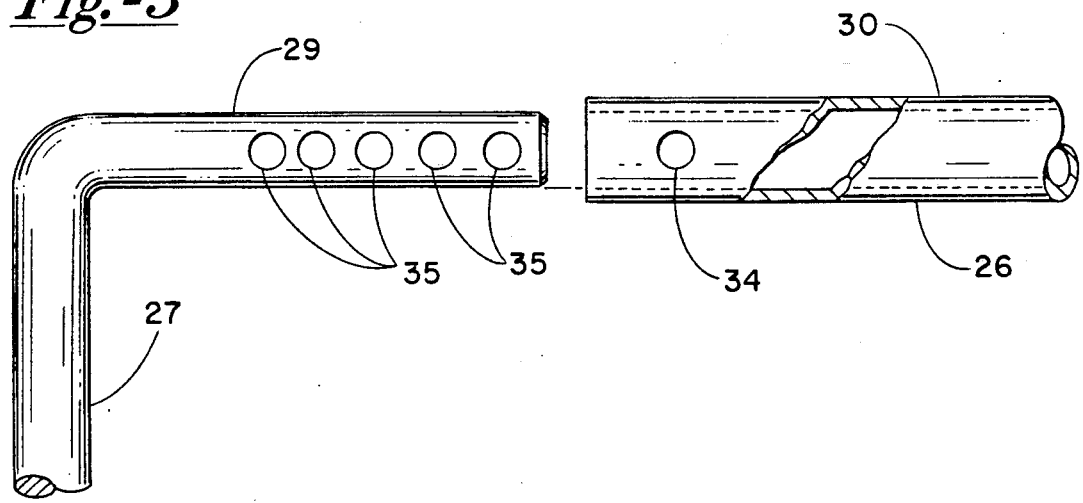
FIG. 3 is a detail fragmentary view of portions of the jaw forming components, with FIG. 3 being shown on a slightly enlarged scale.

Attention is now directed to FIGS. 1-3 of the drawings wherein the wheel chock device generally designated 10 which is arranged to be releasably secured to a vehicle wheel for temporarily encumbering the normal rotation thereof is illustrated. The wheel chock device comprises a generally wedge-shaped solid enclosure having a plurality of surfaces including a horizontal leg segment 12, a vertical leg segment 13, and an inclined wheel-engaging engaging leg 14 which extends between the ends of the horizontal and vertical legs 12 and 13 respectively. A pair of triangular closed opposed end walls 15 and 16 are provided which enclose and define the ramping surface of the individual leg elements. The horizontal leg 12 includes a pair of opposed flange elements as at 18 and 19, each of which extend inwardly from the opposed triangular end walls and define a gap zone as at 20 therebetween. Conversely, vertical leg 13 is provided with a central leg area or closure panel 21 along with a pair of laterally arranged open or gap zones 22 and 23.

A generally "U"-shaped wheel-engaging jaw is provided, with this jaw structure being illustrated generally at 25. The jaw includes a base element 26 having a pair of leg elements 27 and 28 extending from opposed ends thereof. Base 26 comprises a pair of segments 29 and 30 which are arranged to be telescopically coupled together. Furthermore, segments 29 and 30 are arranged to pass through a pair of bores as at 31 and 32 formed in triangular end walls 15 and 16 respectively. A plurality of axially spaced apart mating bores are also provided, with segment 30 having a diametrically extending bore 34 passing therethrough, and with segment 29 having a plurality of spaced apart bores as at 35-35. The bores are arranged so that upon being placed in register, the shackle portion of a padlock may be passed therethrough so as to secure the jaw components together and thereby form a secure jaw.

Figure 5:
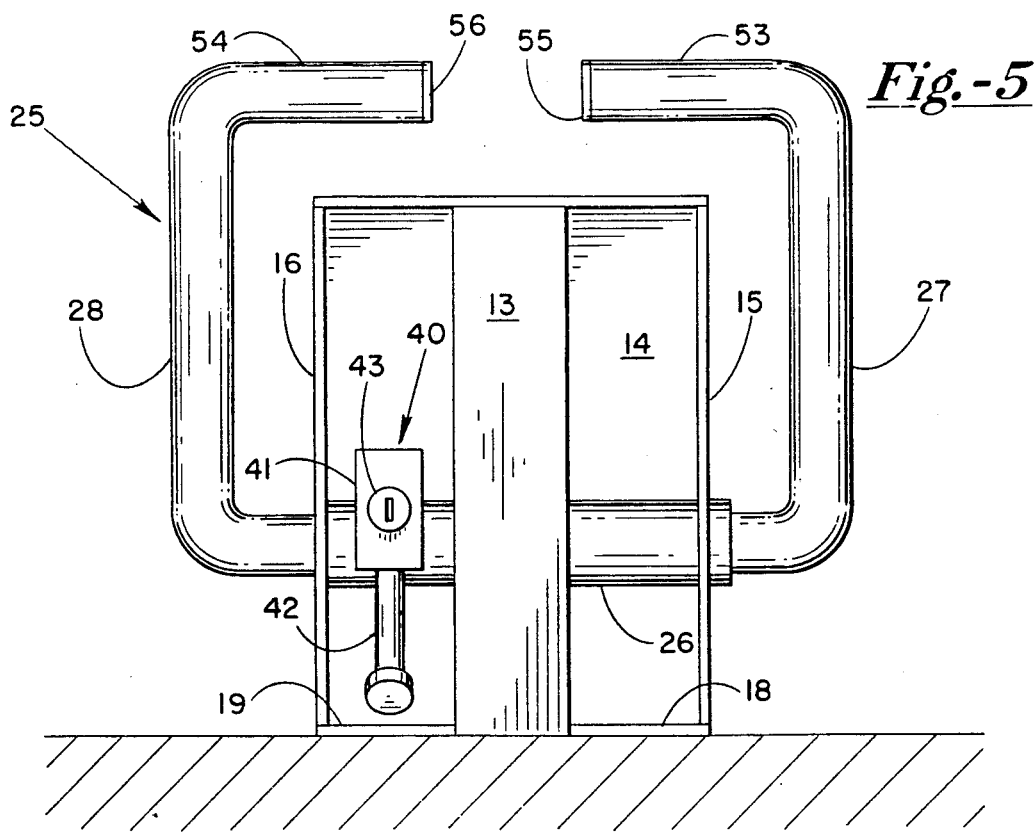
FIG. 5 is a rear elevational view of the device illustrated in FIG. 1.
Figure 6:
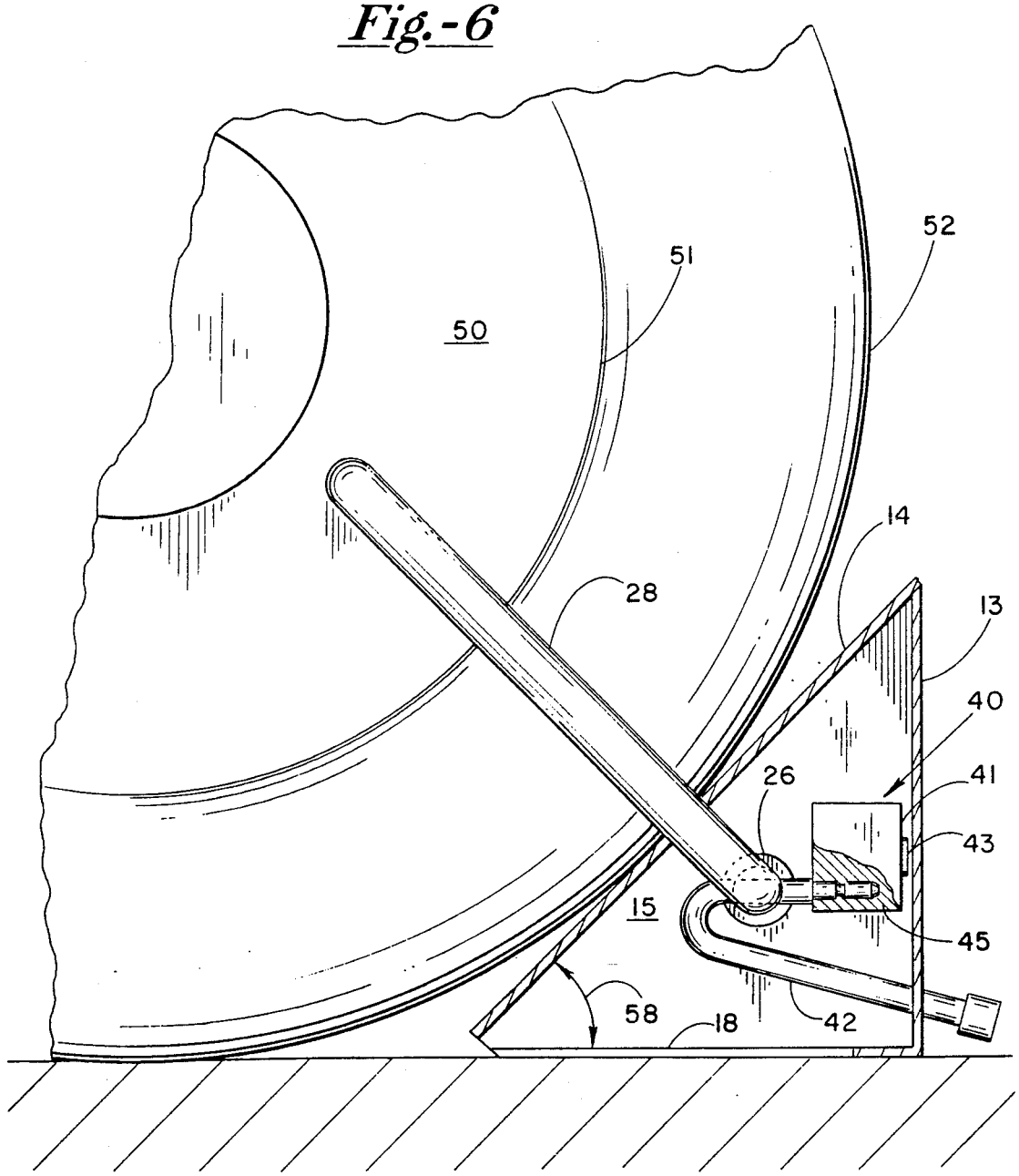
FIG. 6 is a side elevational view, partly in section, illustrating the manner in which the device is secured to a vehicle wheel so as to be retained thereon in locked disposition.

Attention is now directed to FIGS. 5 and 6 of the drawings wherein padlock generally designated 40 is shown. Padlock 40 includes a body portion 41 along with a shackle portion 42, and is arranged to be actuated by a conventional key received within tumbler retaining rotatable element 43. Padlock bodies of this type are commonly commercially available. Shackles may be fabricated from hardened rod-stock fabricated with a padlock body-accommodating groove as illustrated in FIG. 6. The remaining portion of the shackle is designed to accommodate component articulation and handling so as to engage the shackle 42 within the padlock body 41. It will be noted from FIG. 6 that shackle 42 is coupled to body 41 through one leg portion only, as at 45.

Figure 4:
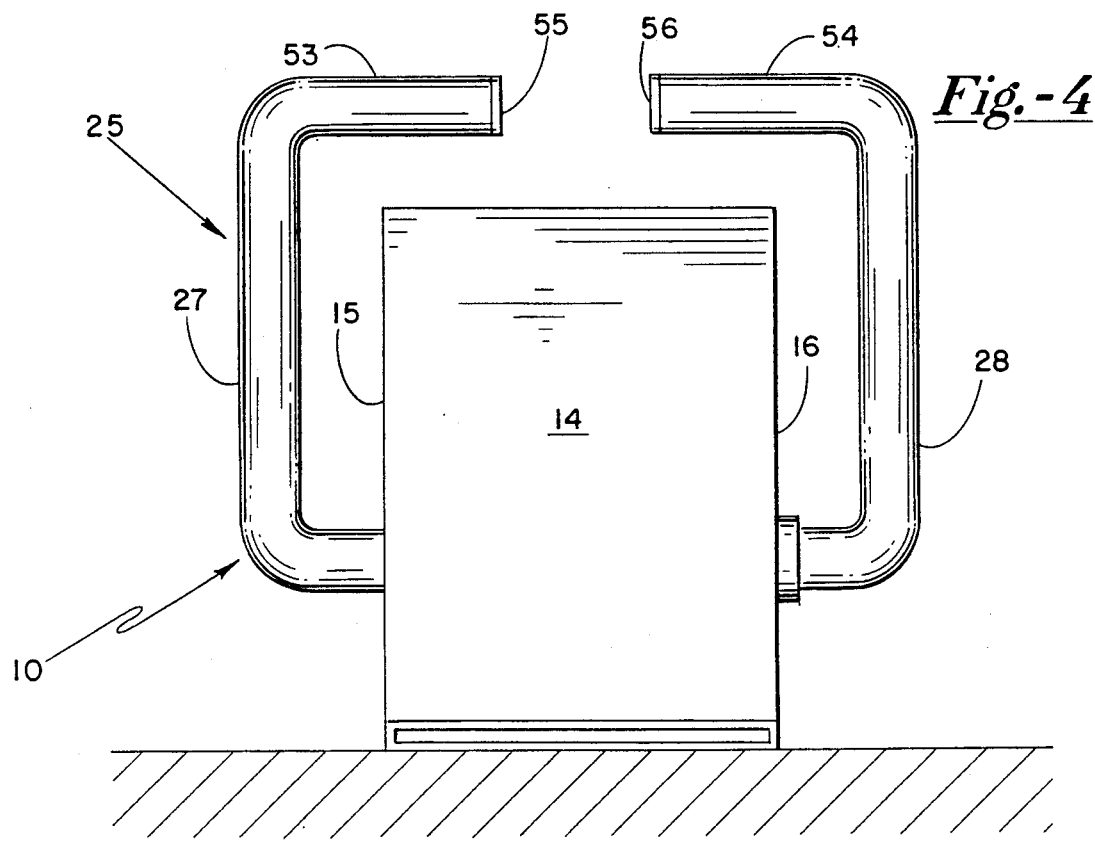
FIG. 4 is a front elevational view of the device illustrated in FIG. 1, and showing the inclined ramp surface.

With continued attention being directed to FIGS. 4 and 6 of the drawings, it will be observed that wheel assembly generally designated 50 includes a central wheel portion 51 together with an annularly arranged conventional tire 52. Jaw 25 is arranged to engage wheel and tire 51 and 52 with the inwardly converging tip elements 53 and 54 capturing the wheel 51 therebetween. In order to avoid marring or scratching the surface of wheel 51, resilient pads are typically provided as at 55 and 56. In order to achieve adjustable positioning of jaw 25, the mating bores 34 and 35-35 are provided, so that shackle portion 42 of padlock 40 may be passed through the assembly.

Inclined surface 14 is preferably arranged at an angle of approximately 45° from the horizontal, particularly as indicated by the arcuate arrows 58 (FIG. 6). It has been found that this angular relationship provides a binding between conventional tired wheels of inner diameters between 13 and 15 inches.

In order to provide ingress of shackle 42 within the wedge-shaped enclosure and to impede the access to padlock 40 from a prying instrument such as a crowbar or the like, openings are provided in the assembly as at 22 and 23. This accommodates manipulation and articulation of the lock mechanism relative to the segments of jaw 25. Leverage from an instrument such as a prybar, crowbar, or the like are ineffective, particularly when applied for leverage against the surface of a resilient air-inflated tire 52.

It will be appreciated that various other components may be utilized in lieu of those illustrated herein, such as use of a conventional padlock in lieu of the padlock 40, or the like.

Those skilled in the art may substitute certain equivalent components for those illustrated herein without actually departing from the spirit and scope of the present invention.

What is claimed is:

1. In a wheel chock device arranged to be releasably secured to a vehicle wheel for temporarily encumbering the normal rotation thereof, said wheel for temporarily encumbering the normal rotation thereof, said wheel chock device comprising, in combination:
    (a) frame means including a generally triangular enclosure having a plurality of surfaces defining a substantially wedge-shaped solid with a horizontal leg, a vertical leg, and an inclined leg extending between the end of said vertical and horizontal legs, a pair of triangular closed opposed end walls enclosing said legs, and with a first of said leg surfaces including opposed flange elements extending inwardly from each of the opposed triangular end walls of said leg block and defining a gap zone therebetween and with a second of said leg surfaces including a web member extending from the apex between said vertical and horizontal legs, and the intersection with said inclined leg and providing access to the interior of said triangular enclosure;
    (b) a generally "U"-shaped wheel-engaging jaw with telescopically engagable first and second base segments, each of said first and second base segments having a leg element extending generally at right angles from opposed ends of said first and second base segments, said first and second base segments being adapted to be telescopically coupled together along said base segments and with each being adapted to pass through a separate one of said triangular end walls, a plurality of axially spaced apart mating bore formed along said telescopically engaged portions of said base segment to form a generally diametrically extending throughbore in said base segment, with each of said through-bores being normally disposed within the interior of said wedge-shaped solid and between said triangular coiled end walls; and
    (c) padlock means including a shackle portion arranged to pass through and to be engaged within one of said through-bores within the interior of said wedge-shaped solid so as to secure said pair of telescopically engagable first and second base segments in locked disposition so as to form a wheel-engaging jaw about the vehicle wheel being encumbered.

2. The wheel chock device as defined in claim 1 being particularly characterized in that said shackle portion of said padlock means is arranged as a "J" member, and with the shorter leg of said "J" having means to be lockingly received within said padlock body.

3. The wheel chock device as defined in claim 2 being particularly characterized in that said "U"-shaped wheel-engaging jaw includes tip elements turned inwardly from said leg elements along an axis parallel to said first and second base segments, and to engage a vehicle wheel therebetween.

* * * * *

UNITED STATES PATENT AND TRADEMARK OFFICE
CERTIFICATE OF CORRECTION

PATENT NO. : 5,137,121

DATED : August 11, 1992

INVENTOR(S) : Paul A. Leonard

It is certified that error appears in the above-identified patent and that said Letters Patent is hereby corrected as shown below:

Column 4, lines 4 and 5, delete the phrase "said wheel for temporarily encumbering the normal rotation thereof,". Line 11, "end" should read -- ends --. Line 32, "bore" should read -- bores --.

Signed and Sealed this

Seventeenth Day of August, 1993

*Attest:*

BRUCE LEHMAN

*Attesting Officer*      Commissioner of Patents and Trademarks